United States Patent [19]

Lace

[11] 3,755,626

[45] Aug. 28, 1973

[54] ELECTRONIC CONTROL CIRCUIT

[75] Inventor: Melvin A. Lace, Prospect Heights, Ill.

[73] Assignee: Motorola, Inc., Franklin Park, Ill.

[22] Filed: Dec. 17, 1971

[21] Appl. No.: 209,050

[52] U.S. Cl. .............................. 179/1 D, 179/1 VL
[51] Int. Cl. .......................... H04r 3/00, H03g 1/02
[58] Field of Search ........ 179/1 D, 1 VL, 100.1 TC; 181/.5 F; 333/28 T; 328/100, 150, 151; 340/172; 325/414; 323/9

[56] References Cited

UNITED STATES PATENTS

| | | | |
|---|---|---|---|
| 3,233,177 | 2/1966 | Stone | 325/414 |
| 2,488,410 | 11/1949 | Keizer | 333/28 T |
| 3,700,811 | 10/1972 | Davidson | 179/1 VL |
| 3,153,189 | 10/1964 | Sweeney | 325/414 |
| 3,302,132 | 1/1967 | Karklys | 328/150 |
| 3,111,635 | 11/1963 | Skov et al. | 333/28 T |

*Primary Examiner*—Kathleen H. Claffy
*Assistant Examiner*—Douglas W. Olms
*Attorney*—Vincent R. Rauner, R. J. LaPorte et al.

[57] ABSTRACT

An electronic control for modifying the amplitude and frequency characteristics of an electrical signal in response to a control signal. The circuit utilizes a pair of oppositely poled parallel coupled semiconductor diodes the impedance of which changes in response to control current flowing therethrough. The oppositely poled configuration allows control signals of either positive or negative polarity to serve as control voltages for modifying the alternating current signal.

2 Claims, 2 Drawing Figures

ELECTRONIC CONTROL CIRCUIT

BACKGROUND

This invention relates generally to signal control circuits and more particularly to semiconductor gain and tone controls.

Gain and tone control circuits are commonly used in radio receivers and the like. These circuits generally utilize a mechanical potentiometer to vary the resistance of an element in the gain or tone control circuit to effect a change in the characteristics of an alternating current signal being processed. Other circuits utilize active components such as tubes, transistors and diodes to provide the resistance changes for modifying the alternating current signals.

Whereas these techniques provide a useful way to vary the gain or tone of a signal, the first technique becomes complex and costly when a multiplicity of circuits are required. For example, in a four-channel stereo system, four potentiometers are required to provide gain control, and at least four more are required to provide tone control. The use of a multiplicity of potentiometers unnecessarily increases the size of the unit in which they are employed. In addition, because of the nonuniformity of potentiometers, the gain or tone of the four channels is not varied uniformly in response to the adjustment of the gain or tone control. The active gain or tone controls allow the gain or tone to be controlled from a single control, such as, for example, a potentiometer, which provides a control signal to the circuit. However, present circuits require the control signal to have a predetermined polarity compatible with the particular control circuit used, making the control circuits inoperable for applications wherein the polarity of the control signal cannot be controlled.

SUMMARY

Accordingly, it is an object of the present invention to provide a signal modifying circuit that modifies a signal in response to a control signal having either positive or negative polarity.

It is another object of this invention to provide a gain control for simultaneously varying the gain of a plurality of signals in response to a single control signal.

It is a further object of this invention to provide a tone control for varying the tone of a plurality of signals in response to a single control signal.

It is yet another object of this invention to provide a simplified volume and tone control system for multichannel audio systems.

Another object of this invention is to provide a control system for controlling the tone and volume of a multi-channel audio system that requires only one potentiometer for each function regardless of the number of channels controlled.

A further object of this invention is to provide a control system for a plurality of signal channels wherein each channel is modified to substantially the same degree as every other channel in response to a control signal.

In accordance with a preferred embodiment of the invention, a pair of oppositely poled diodes are connected to each other in a parallel configuration. The parallel combination of diodes is connected in series with a signal carrying impedance. A control signal of either positive or negative polarity is applied to the diodes to vary the resistance of the diodes, thereby diverting various amounts of the signal from the signal carrying impedance. The amount of signal diverted can be independent of the frequency of the signal to provide a gain control, or can be dependent on the frequency of the signals to provide a tone control.

The signal modifying technique of the present invention is equally applicable to all low level circuits including audio, video, and other electrical circuits.

DETAILED DESCRIPTION

Figure 1:
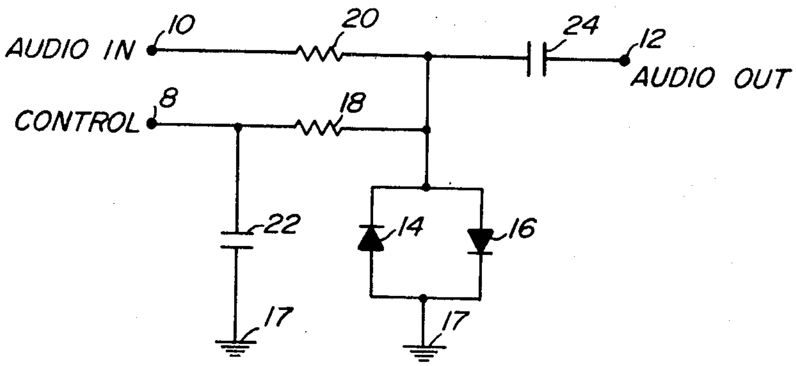
FIG. 1 is a schematic diagram of a gain control circuit according to the invention.

Referring to FIG. 1, there is shown an embodiment of a gain control according to the invention. A pair of oppositely poled diodes 14 and 16 are connected to each other in a parallel configuration. Diodes 14, 16 are semiconductor diodes made from silicon, germanium or other semiconductor material. Diodes having a low forward junction voltage, such as, for example, germanium diodes are preferable. One end of each of diodes 14 and 16 is connected to ground 17, while the other end of each diode is connected to one end of resistors 18, 20 and to an end of capacitor 24. A capacitor 22 is connected between the other end of resistor 18 and ground point 17.

In operation, a signal, such as, for example, an audio signal is applied to the unconnected end of resistor 20 at point 10. The amplitude of this signal must be relatively small so that the signal does not cause the impedance of diodes 14 and 16 to vary substantially. A control signal of either positive or negative polarity is applied to the junction of resistor 18 and capacitor 22 at point 8. A signal substantially similar to the signal applied to point 10 having an amplitude modified in accordance with the control signal applied to point 8 is obtained from the unconnected end of capacitor 24 at point 12.

The parallel combination of diodes 14 and 16 in series with resistor 20 form a resistive divider network for the signal applied to input point 10. The control signal applied to point 8 varies the impedance of diodes 14, 16, thereby adjusting the division ratio of the divider. Semiconductor diodes have an impedance characteristic that varies in accordance with the current flow therethrough. The impedance of a diode is generally relatively high when the diode is conducting small currents and decreases to a lower value as the current is increased. In the circuit of FIG. 1, the control voltage applied to point 8 causes a current to flow through resistor 18 and through one of diodes 14, 16. If the control voltage has a positive polarity, diode 14 will be reverse biased and the control current will flow through resistor 18 and diode 16. Increasing the control voltage increases the control current through diode 16, thereby lowering the impedance thereof. As the impedance of diode 16 is lowered, a greater portion of the signal voltage applied at point 10 will appear across resistor 20 and a correspondingly smaller portion of the signal voltage will appear across diodes 14, 16. Since the output point 12 is connected through capacitor 24 to the diode pair 14, 16, the reduction in signal voltage across diodes 14, 16 will cause a reduction in the amplitude of the output signal obtained at point 12. A similar result is obtained when a negative control voltage is applied to point 8. In this instance, diode 16 is reverse biased and the impedance of diode 14 is varied to control the amplitude of the output signal at point 12. The circuit works equally well for positive and negative polarity control voltages, and may even be used with alternating current control voltages in circuits where it is desired to control the amplitude of a signal in accordance with a varying control signal.

The values of capacitors 22 and 24 are not critical to the operation of the circuit. Capacitor 22 serves as a bypass capacitor to shunt to ground 17 any undesired AC components which may be applied to control point 8. Capacitor 22 also prevents the AC signals appearing at input point 10 from being applied to the control voltage through resistors 18 and 20. Capacitor 24 serves to prevent control voltage variations applied to diodes 14, 16 from being applied to output point 12. These capacitors may be eliminated in cases where the aforementioned isolation is not required.

Figure 2:
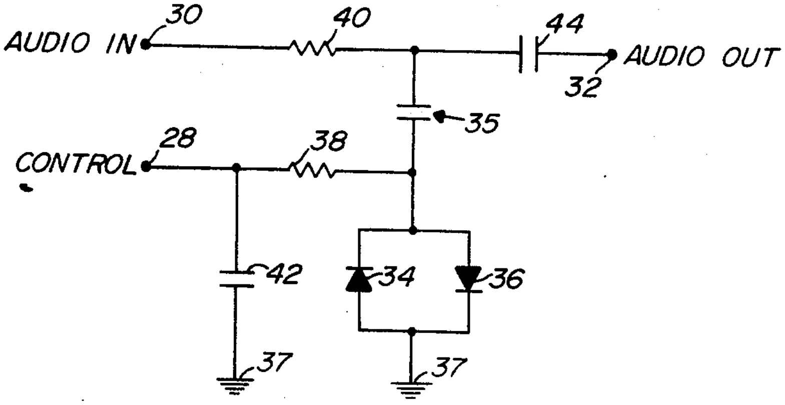
FIG. 2 is a schematic circuit diagram of a tone control according to the invention.

Referring to FIG. 2, there is shown one embodiment of a tone control circuit according to the invention. A pair of oppositely poled diodes 34, 36 are connected to each other in a parallel configuration. Diode pair 34, 36, a capacitor 35 and a resistor 40 are connected in a series configuration between an audio input point 30 and ground 37. A blocking capacitor 44 is connected between the junction of resistor 40 and capacitor 35 and an output point 32. A control signal resistor 38 is connected between a control point 28 and the junction of diodes 34, 36 and capacitor 35. A bypass capacitor 42 is connected between control point 28 and ground 37.

The operation of the circuit of FIG. 2 is similar to that of the circuit of FIG. 1. The impedance of one of the diodes 34, 36 is varied in accordance with a control signal applied to point 28. Diodes 34, 36 form the variable impedance portion of a voltage divider network comprising resistor 40, capacitor 35 and diodes 34, 36. Whereas the circuit of FIG. 1 attenuates all frequency components of the input signal equally, in the circuit of FIG. 2, capacitor 35 serves as a frequency selective element which passes high frequency components more readily than low frequency components.

In operation, an electrical signal is applied to input point 30. The input signal is modified by the divider network comprising resistor 40, capacitor 35 and diodes 34, 36 in response to the control signal applied to point 28, and appears at output point 32. As the impedance of diodes 34, 36 is varied as a result of control current flowing from point 28 through resistor 38 and one of the diodes 34, 36, the high frequency components of the signal flowing from point 30 through resistor 40 and capacitor 44 to output 32 are shunted through capacitor 35 and diodes 34, 36 to ground 37. Low frequency components of the input signal are relatively unaffected because capacitor 35 appears as a high impedance to low frequency components, thereby preventing the low frequency components from flowing through diodes 34, 36 to ground 37. As a result, the circuit of FIG. 2 modifies the frequency spectrum of the signal applied to point 30 in response to control signals applied to point 28. The frequency modified signal appears at output point 32.

The circuit of FIG. 2 is well suited to audio tone control applications and to other small signal applications wherein it is desired to vary the frequency spectrum of a signal. Whereas the frequency selective element of this embodiment is a capacitor 35, any frequency selective element including inductors, capacitors, resonators and active devices may be used to achieve the desired spectrum modification.

The control circuits of the present invention are particularly useful for multi-channel systems, such as, for example, four-channel stereo systems. In a four-channel stereo system, one of each of the circuits of FIGS. 1 and 2 may be utilized in each channel as a gain and tone control, respectively. A common control signal can be applied to all of the gain controls, and another control voltage can be applied to all of the tone controls. The control voltage for the gain controls can be obtained from a source of control signals, such as, for example, a potentiometer. Similarly, the control voltage for the tone controls can be obtained from another potentiometer. Connecting the circuits in this way allows a single control to be used for each function, regardless of the number of channels to be controlled.

In summary, the present invention provides a simple, economical way to remotely control the gain or frequency distribution of an electrical signal. The circuit operates equally well with positive or negative polarity control signals, and any number of circuits may be controlled from a single potentiometer or other control.

I claim:

1. A control circuit having an input, an output, a common and a control terminal for modifying an audio frequency signal applied to said input terminal in response to a control current applied to said control terminal and for applying the modified audio frequency signal to said output terminal, said control circuit comprising:

first and second semiconductor diodes each having a cathode and an anode terminal, the cathode terminal of the first diode and the anode terminal of the second diode being connected to said common terminal, and the anode terminal of the first diode being connected to the cathode terminal of the second diode to form a junction;

a resistor connected in a series circuit between said input and output terminals, said resistor being further connected in a second series circuit between said input terminal and said junction, said resistor and said diodes forming a voltage divider network between said input and output terminals; and a current limiting resistor connected to said control terminal and to said junction for applying dual polarity control current from the control terminal to said diodes to vary the impedance thereof in accordance with the magnitude of the control current applied thereto.

2. A control circuit as recited in claim 1 further including a capacitor connected in said second series circuit in series with said resistor and said junction, said capacitor and said diodes cooperating to vary the tone of the modified audio signal applied to said output terminal.

* * * * *